United States Patent
Shin et al.

(10) Patent No.: US 9,372,342 B2
(45) Date of Patent: Jun. 21, 2016

(54) OPTICAL FINGERPRINT ACQUISITION APPARATUS

(75) Inventors: Yo-shik Shin, Seoul (KR); Geum-yong Kim, Seoul (KR)

(73) Assignee: UNION COMMUNITY CO., LTD., Seoul (KR)

(*) Notice: Subject to any disclaimer, the term of this patent is extended or adjusted under 35 U.S.C. 154(b) by 762 days.

(21) Appl. No.: 13/597,841

(22) Filed: Aug. 29, 2012

(65) Prior Publication Data

US 2013/0057669 A1    Mar. 7, 2013

(30) Foreign Application Priority Data

Sep. 6, 2011  (KR) .................... 10-2011-0090241
Jun. 4, 2012  (KR) .................... 10-2012-0059802

(51) Int. Cl.
*G06K 9/00*      (2006.01)
*G02B 27/00*     (2006.01)
*G02B 3/06*      (2006.01)

(52) U.S. Cl.
CPC .............. *G02B 27/0025* (2013.01); *G02B 3/06* (2013.01); *G06K 9/00046* (2013.01)

(58) Field of Classification Search
CPC ... H04N 7/18; G02B 27/0025; G06K 9/00046
USPC .................. 348/161; 382/124–127
See application file for complete search history.

(56) References Cited

U.S. PATENT DOCUMENTS

| | | | | | |
|---|---|---|---|---|---|
| 1,735,108 | A * | 11/1929 | Cox | ............ | G01M 11/00 359/737 |
| 2,354,614 | A * | 7/1944 | Reason | ............ | G02B 1/00 353/70 |
| 5,109,427 | A * | 4/1992 | Yang | ............ | 382/127 |
| 5,740,276 | A * | 4/1998 | Tomko | ............ | G07C 9/00158 235/494 |
| 5,900,993 | A * | 5/1999 | Betensky | ............ | G06K 9/00046 356/71 |
| 6,929,730 | B2 * | 8/2005 | Lee | ............ | G01N 27/44791 204/451 |
| 6,934,089 | B1 * | 8/2005 | Kallo | ............ | G02B 9/12 359/661 |
| 6,980,286 | B1 * | 12/2005 | Feng | ............ | G02B 13/08 356/71 |
| 7,742,229 | B2 * | 6/2010 | Destain | ............ | G02B 13/16 359/292 |
| 2006/0198018 | A1 * | 9/2006 | Shafer | ............ | G02B 17/08 359/365 |
| 2006/0231731 | A1 * | 10/2006 | Lauer et al. | ............ | 250/201.9 |
| 2007/0053075 | A1 * | 3/2007 | Kamo | ............ | G02B 13/16 359/733 |
| 2009/0244498 | A1 * | 10/2009 | Matsubara | ............ | G03B 21/28 353/97 |
| 2010/0110275 | A1 * | 5/2010 | Mathieu | ............ | A61B 3/14 348/360 |
| 2011/0194191 | A1 * | 8/2011 | Shibata | ............ | G02B 15/177 359/680 |

* cited by examiner

*Primary Examiner* — Jefferey Harold
*Assistant Examiner* — Humam Satti
(74) *Attorney, Agent, or Firm* — Leydig, Voit & Mayer, Ltd.

(57) ABSTRACT

Provided is an optical fingerprint acquisition apparatus. The fingerprint acquisition apparatus has an improved optical lens unit and can correct distortion of an image caused by a light refractor. The optical lens unit includes two cylindrical lenses disposed so that an optical axis of incident light does not coincide with a central axis of the lenses. The optical lens unit corrects an image that is distorted into a rectangle by a light refractor, thereby restoring a square shape. In particular, the fingerprint acquisition apparatus is useful in the simultaneous acquisition of multiple fingerprints as well as the acquisition of a single fingerprint.

13 Claims, 4 Drawing Sheets

OPTICAL FINGERPRINT ACQUISITION APPARATUS

CROSS-REFERENCE TO RELATED APPLICATION

This application claims priority to and the benefit of Korean Patent Application No. 10-2011-0090241 filed on Sep. 6, 2011 and No. 10-2012-0059802 filed on Jun. 4, 2012, the disclosures of which are incorporated herein by reference in their entirety.

BACKGROUND

1. Field of the Invention

The present invention relates to an optical fingerprint acquisition apparatus capable of acquiring a fingerprint image without distortion by correcting rectangular deformation and trapezoidal distortion that may occur in an optical fingerprint acquisition process using a light refractor such as a prism.

2. Discussion of Related Art

Due to its unique and unchangeable nature, a user's biological information is widely used for personal authentication with information equipment. Among the user's biological information, a fingerprint is a means for authentication that has attracted the most attention and has been generalized due to its simple structure and convenience.

A fingerprint acquisition apparatus is an apparatus for acquiring an image of a user's fingerprint for the purpose of authentication, etc., and is generally combined with a means for extracting minutiae data from the acquired fingerprint image. For example, the minutiae data obtained from the fingerprint image is used for fingerprint authentication. Although there are other fingerprint acquisition methods, optical fingerprint acquisition methods using an optical device such as a prism are most widely used.

Furthermore, the optical fingerprint acquisition methods are generally classified as a method in which a fingerprint image is determined according to absorption of light at ridges of a fingerprint (a so-called "absorption type"), and a method in which a fingerprint image is formed by light scattered by the ridges (a so-called "scattering type").

FIG. 1 illustrates an example of an optical fingerprint acquisition apparatus using a prism. A fingerprint acquisition apparatus 100 includes a prism 10 that comes in contact with a user's fingerprint, a light source 11 that emits light toward the prism 10, an image sensor 13 that finally outputs a fingerprint image as a digital signal, and a lens 15 that projects the fingerprint image emitted from the prism 10 onto the image sensor 13.

When the user's finger comes in contact with a fingerprint contact surface 10a of the prism, light emitted from the light source 11 is incident on the fingerprint contact surface 10a through the prism 10. The light reflected, scattered or refracted according to the shape of a fingerprint in contact with the fingerprint contact surface 10a is emitted to the lens 15 to create an image and is input to the image sensor 13.

When the fingerprint acquisition apparatus 100 is the scattering type, light emitted from the light source 11 is incident on a fingerprint contact surface 10a at right angles or a smaller angle than a threshold angle for total reflection. Since the light is refracted and travels without total reflection at grooves of a fingerprint and scatters at ridges of the fingerprint, an image in which the ridges of the fingerprint are bright and the grooves are dark is acquired.

When the fingerprint acquisition apparatus 100 is the absorption type, light emitted from the light source 11 is incident on the fingerprint contact surface 10a at a greater angle than the threshold angle for total reflection and is totally reflected at the grooves. Thus, an image in which the grooves of a fingerprint are bright and ridges are dark is acquired.

In a fingerprint image emitted from the prism 10, various distortions may occur. For example, a square image having one side length of 2×a on the fingerprint contact surface 10a looks remarkably reduced in up-down direction (vertically) after passing through the prism 10.

This is because an apparent image of an image projected onto the lens 15 is distorted due to refraction and so on. Light reflected by the fingerprint contact surface 10a of the prism 10 is refracted at a surface of emission 10b and projected onto the lens 15. Thus, when an image including object points A, B and C disposed at the same intervals on the fingerprint contact surface 10a is actually projected onto the lens 15, an apparent image is formed by virtual object points A1, B1 and C 1 disposed at the same intervals of $b_1$.

As shown in the drawing, since the interval a>the interval $b_1$, a vertical length of the fingerprint image becomes $2×b_1$ and looks smaller than an actual length of 2a. On the other hand, a horizontal length 2a of the fingerprint image almost does not change and is projected as is, and thus a square image on the fingerprint contact surface 10a looks remarkably reduced in the up-down direction (vertically) after passing through the prism 10. In practice, the square image does not look like a rectangle whose vertical length is simply shortened but rather looks like a trapezoid due to distortion caused by other optical factors.

Meanwhile, a fingerprint acquisition apparatus may acquire fingerprints of one finger at a time or all fingers at once. In the latter case, a size of the prism 10 proportionally increases, but a fingerprint image is distorted far more than in the former case.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention is directed to providing an optical fingerprint acquisition apparatus capable of acquiring a fingerprint image without distortion by correcting rectangular deformation and trapezoidal distortion that may occur in an optical fingerprint acquisition process using a light refractor such as a prism.

According to an aspect of the present invention, there is provided an optical fingerprint acquisition apparatus including a light refractor and an image sensor and acquiring an image of a fingerprint coming in contact with a fingerprint contact surface of the light refractor, the apparatus including: a first lens that is a plano-cylindrical lens on which light emitted from the light refractor is incident; a second lens that is a plano-cylindrical lens centered on a virtual axis passing through a center of the first lens and on which light emitted from the first lens is incident; a third lens configured to project light emitted from the second lens onto the image sensor; and an aperture stop provided between the first lens and the second lens or behind the second lens.

Here, the first lens and the second lens may be installed so that an optical axis of the light emitted from the light refractor does not coincide with the virtual axis, and may correct an image distorted by the light refractor.

According to an exemplary embodiment, the first lens may be a plano-convex cylindrical lens of which a surface of incidence produces a positive magnification and a surface of emission is flat, and the second lens may be a plano-concave cylindrical lens of which a surface of incidence is flat and a surface of emission produces demagnification.

Furthermore, the magnifying power of the first lens and the second lens may be determined so that emission angles of an image emitted from the second lens from the viewpoints of the Y-section optical system and the X-section optical system are almost the same.

According to another exemplary embodiment, the optical axis of the light emitted from the light refractor may be disposed above or below the virtual axis, so that the light emitted from the light refractor is off-center and incident on an upper portion or a lower portion of the first lens.

In another method, the fingerprint acquisition apparatus according to exemplary embodiments of the present invention may further include a mirror configured to alter a path of the light emitted from the light refractor to be incident on the first lens while inverting the light, so that the light emitted from the light refractor is off-center and incident on a lower portion of the first lens.

Also, the image sensor may be installed to be tilted according to an optical axis of the light emitted from the second lens.

According to exemplary embodiments, the third lens may further include a thirty-first lens and a thirty-second lens sequentially disposed between the second lens and the image sensor. Here, the thirty-first lens may have a convex surface of incidence and a concave surface of emission, and the thirty-first lens may have a convex surface of incidence and a convex surface of emission.

BRIEF DESCRIPTION OF THE DRAWINGS

The above and/or other aspects of the present invention will become more apparent by describing certain exemplary embodiments of the present invention with reference to the accompanying drawings, in which.

DETAILED DESCRIPTION OF EXEMPLARY EMBODIMENTS

Figure 1:
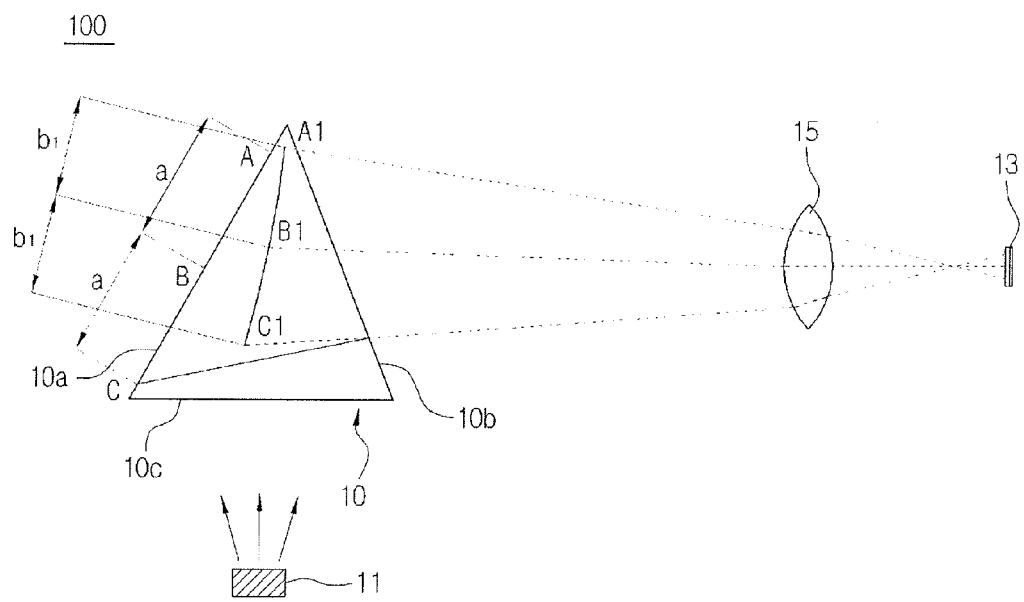
FIG. 1 conceptually illustrates a constitution of an existing fingerprint acquisition apparatus.

Certain exemplary embodiments of the present invention will now be described greater detail with reference to the accompanying drawings.

In the following description, the same drawing reference numerals are used to denote the same elements even in different drawings. Matters defined in the description, such as detailed construction and elements, are provided to assist in obtaining a comprehensive understanding of the invention. Thus, it is apparent that the exemplary embodiments of the present invention can be carried out without those specifically defined matters. Also, well-known functions or constructions may not be described in detail if such description could obscure the disclosure of the invention.

A fingerprint acquisition apparatus according to exemplary embodiments of the present invention is applied to optical fingerprint acquisition apparatuses using a light refractor such as a prism, and is not limited to a specific fingerprint acquisition mechanism such as a scattering type or an absorption type.

Figure 2:
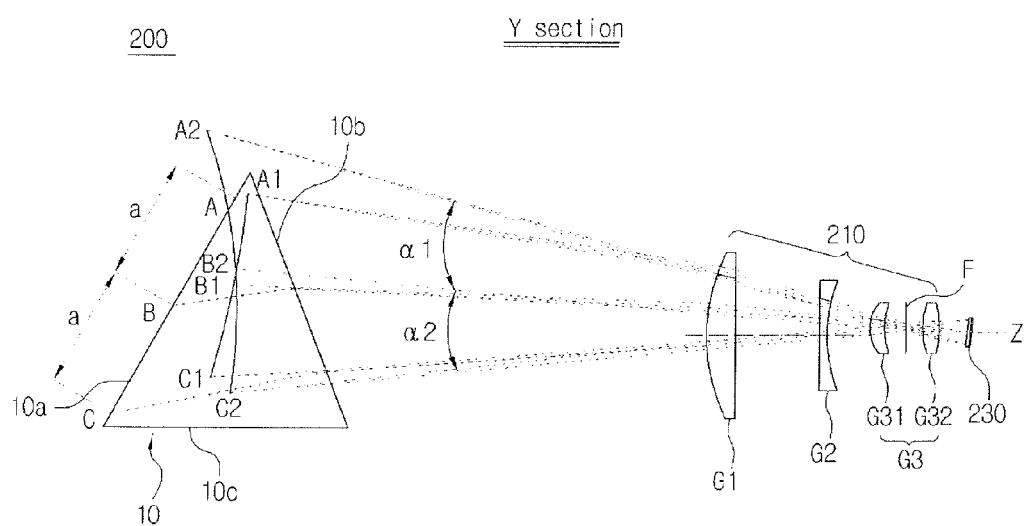
FIG. 2 illustrates a fingerprint acquisition apparatus (Y-section optical system) according to an exemplary embodiment of the present invention.
Figure 3:
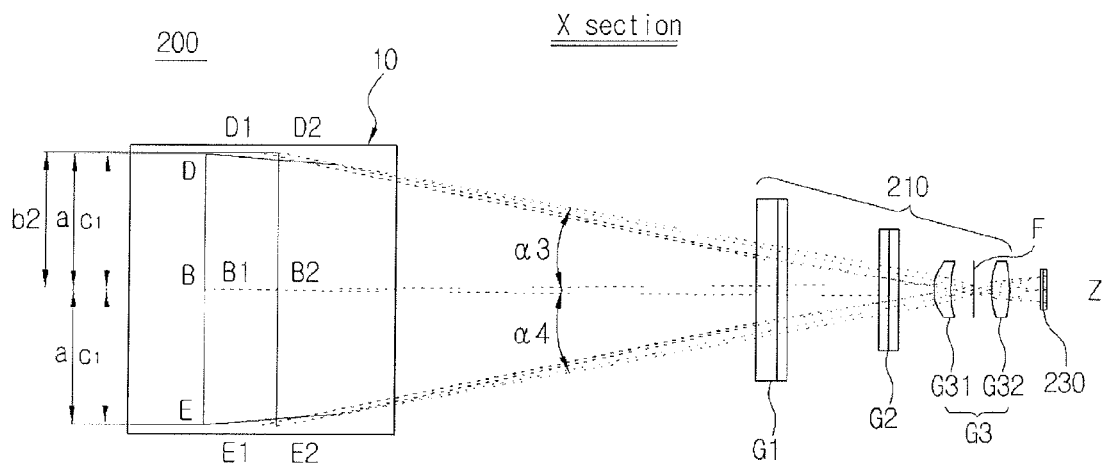
FIG. 3 illustrates an X-section optical system of the fingerprint acquisition apparatus of FIG. 2.

FIG. 2 and FIG. 3 schematically illustrate one of various examples of a fingerprint acquisition apparatus 200 according to an exemplary embodiment of the present invention. FIG. 2 is a side sectional view taken along a vertical direction (Y-axis direction) and showing a "Y-section optical system," and FIG. 3 is a top view of the fingerprint acquisition apparatus 200 of FIG. 2 showing an "X-section optical system" taken along a horizontal direction (X-axis direction). The Y-section is orthogonal to the X-section.

The fingerprint acquisition apparatus 200 according to an exemplary embodiment of the present invention includes a light refractor 10, an optical lens unit 210 for projecting a fingerprint image, and an image sensor 230.

In addition to the constitution shown in FIG. 2, the fingerprint acquisition apparatus 200 may further include an internal light source and other elements for acquiring a fingerprint image. For example, a light source is not limited to the light source 11 shown in FIG. 1, the position and shape of the light source may vary according to a fingerprint recognition method and the shape of the light refractor 10. However, such elements are not important parts of the present invention, and will be described only in case of need.

The light refractor 10 is a device that refracts incident light and emits the refracted light. Light incident on the light refractor 10 includes the fingerprint image of a fingerprint that comes in contact with one side of the light refractor 10. A cross section of the light refractor 10 may have a triangle shape such as the prism of FIG. 1, or a quadrangle such as a trapezoid.

The light refractor 10 includes a fingerprint contact surface 10a that comes in contact with a fingerprint, and a surface of emission 10b from which light reflected or scattered by the fingerprint contact surface 10a (fingerprint image) is emitted. Also, the light refractor 10 may further include a surface of incidence on which light for fingerprint acquisition is incident according to the position of the internal light source 11. For example, the light refractor 10 of FIG. 2 has a surface of incidence 10c on which light emitted from a light source is incident.

The fingerprint contact surface 10a of the light refractor 10 includes an "image area" in a square shape that is finally made into an image by the image sensor 230. In other words, the fingerprint contact surface 10a of the light refractor 10 has a size equal to or greater than that of the "image area." Meanwhile, the fingerprint contact surface 10a or the image area may have a size to come in contact with one knuckle of a finger like a general fingerprint input device, or a size to come in contact with knuckles of a plurality of fingers all together.

Figure 4:
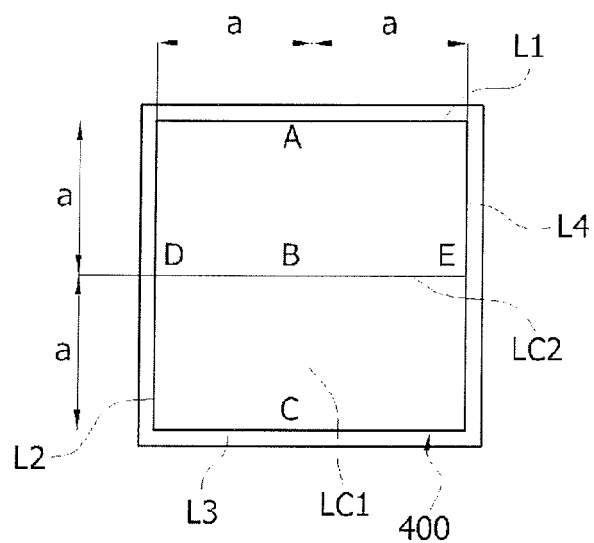
FIG. 4 illustrates a contact area of a fingerprint input window of FIG. 2.

FIG. 4 shows an example of an image area 400 of the light refractor 10 of FIG. 2. For convenience, it is assumed that the length of one side of the square image area 400 shown in FIG. 4 is 2a, and respective sides are indicated as a first or right side L1, a second or left side L2, a third or bottom side L3, and a fourth or top side L4. A first centerline LC1 in the Y-axis direction (vertical direction) and a second centerline LC2 in an X-axis direction (horizontal direction) cross at right angles at a central point B and divide the image area 400 into four parts of the same size. The first centerline LC1 meets the first or right side L1 at an object point A to divide the first side L1 into two parts, and meets the third or bottom side L3 at an object point C to divide the third side L3 into two parts. The second centerline LC2 meets the second or left side L2 at an object point D to divide the second side L2 into two parts, and meets the fourth or top side L4 at an object point E to divide the third side L4 into two parts.

In the Y-section optical system, the light refractor 10 of FIG. 2 is in the same state as the light refractor 10 of FIG. 1, and thus an image incident on the optical lens unit 210 does not become an image of the image area 400 as it is but becomes an apparent image. The object points A, B and C in the image area 400 are distorted to virtual object points A1, B1 and C1 in the apparent image, and thus a>$b_1$. Here, $b_1$ is a distance between the virtual object points A1 and B1 (or B1 and C1).

In the X-section optical system also, the object points D, B and E in the image area 400 are distorted to virtual object points D1, B1 and E1 in the apparent image as shown in FIG. 3. However, a≈$b_2$, and thus almost no distortion occurs. Here, $b_2$ is a distance between the virtual object points D1 and B1 (or B1 and E1).

Consequently, instead of the square image area 400 having a size of 2a×a, the apparent image having a size of 2a×2$b_1$ (=2$b_2$×2$b_1$) is emitted to the optical lens unit 210 through the surface of emission 10b of the light refractor 10.

The optical lens unit 210 projects the image emitted from the light refractor 10 onto the image sensor 230 and simultaneously corrects the image distorted by the light refractor 10. To this end, the optical lens unit 210 according to an exemplary embodiment of the present invention includes a first lens G1 and a second lens G2.

The first lens G1 and the second lens G2 are disposed in a line so that a Z-axis passes through the centers of the lenses G1 and G2. However, the Z-axis of the fingerprint acquisition apparatus 200 according to an exemplary embodiment of the present invention is located so as not to coincide with an optical axis of the light emitted from the light refractor 10. In other words, the centers of the first lens G1 and the second lens G2 are not aligned with the optical axis of the light emitted from the light refractor 10. This lack of alignment is different from the center of the lens 15 that is disposed on an optical axis of the light emitted from the light refractor 10 in the acquisition apparatus 100 of FIG. 1.

More specifically, from the viewpoint of the Y-section optical system of FIG. 2, a light ray at the object point A (or a light ray at the virtual object point A1) is incident on an upper edge of the first lens G1, and a light ray at the object point C (or a light ray at the virtual object point C1) is incident on the approximate center of the first lens G1. In other words, from the viewpoint of the Y-section optical system, the first lens G1 and the second lens G2 are disposed so that an optical axis of the incident light emitted from the light refractor 10 does not pass through the centers of the first lens G1 and the second lens G2, and does not pass through the entire surface of each of the first lens G1 and the second lens G2, but, instead, passes through only one of an upper portion and a lower portion of each of the first lens G1 and the second lens G2. For example, FIG. 2 illustrates an example in which only upper portions of the first lens G1 and the second lens G2 are used, and the optical axis of the light incident on the first lens G1 and the second lens G2, i.e., of the light emitted from the light refractor 10, does not pass through the centers of the first lens G1 and the second lens G2, but, instead, passes through the upper portions of the first lens G1 and the second lens G2. Thus, as shown in GIH. 2, in the Y-section optical system, the light rays from the virtual object points A1, B1, and C1 are oblique to and intersect the Z-axis that passes through the centers of the first lens G1 and the second lens G2.

On the other hand, from the viewpoint of the X-section optical system, the optical axis of the light emitted from the light refractor 10 passes through the centers of the first lens G1 and the second lens G2.

Thus, the first lens G1 and the second lens G2 do not need to be in their full shapes as shown in FIG. 2 and FIG. 3, and from the viewpoint of the Y-section optical system, the lower portions of the first lens G1 and the second lens G2 may be cut off according to exemplary embodiments.

The first lens G1 and the second lens G2 are plano-cylindrical lenses and constitute a so-called "anamorphic lens system." Each of the first lens G1 and the second lens G2 includes one planar surface and one "cylindrical" surface. The respective cylindrical surfaces are portions of surfaces of respective cylinders having respective radii and axes. The axes of the cylindrical surfaces of the lenses G1 and G2 are perpendicular to the vertical direction, as shown in the Y-section of FIG. 2.

The first lens G1 is a plano-convex cylindrical lens of which a surface of incidence produces a positive magnification and a surface of emission is flat. The incident surface of the first lens G1 functions as a convex lens with respect to the Y-section optical system and as a plane lens with respect to the X-section optical system, thus having different magnifications in the horizontal and vertical directions.

The second lens G2 is a plano-concave cylindrical lens of which a surface of incidence is flat and a surface of emission produces demagnification. The surface of emission of the second lens G2 functions as a concave lens with respect to the Y-section optical system and as a plane lens with respect to the X-section optical system.

Thus, in the Y-section optical system of FIG. 2, an emission angle relative to the rear surface of the second lens G2 becomes greater than an incidence angle relative to the front surface of the first lens G1. On the other hand, in the X-section optical system of FIG. 3, an incidence angle relative to the front surface of the first lens G1 is the same as an emission angle relative to the rear surface of the second lens G2.

In the Y-section optical system of FIG. 2, an image projected through the surface of emission 10b of the light refractor 10 is refracted again through the first lens G1 and the second lens G2, and thus new virtual object points A2, B2, and C2 corresponding to the virtual object points A1, B1, and C1 are formed. The virtual object points A2, B2, and C2 are intersection points obtained by reversely projecting light emitted from the second lens G2. An angle α1 between A2 and B2 is slightly different from an angle α2 between B2 and C2 due to the positioning of the centers of the lenses G1 and G2 on the Z-axis, which is not aligned with the optical axis of the light emitted from the light refractor 10.

Meanwhile, by setting the object point B2 of the X-section optical system at the same position as the object point B2 of the Y-section optical system, virtual object points D2, B2 and E2 may be indicated on the X-section optical system as shown in FIG. 3. The virtual object points D2, B2 and E2 correspond to the original virtual object points D1, B1 and E1. Since an angle α3 between D2 and B2 is almost the same as an angle α4 between E2 and B2, the virtual object points D2, B2 and E2 are spaced apart at almost the same intervals, and there is no particular distortion.

Here, the first lens G1 and the second lens G2 make the angle α1 between A2 and B2 and the angle α2 between B2 and C2 close to the angle α3 between D2 and B2 and the angle α4 between E2 and B2, thereby restoring an image formed by the virtual object points A2, B2, C2, D2 and E2 not in the form of a rectangle but in the form of a square and correcting distortion. In other words, an emission angle (α1+α2) of the second lens G2 in the Y-section optical system and an emission angle (α3+α4) in the X-section optical system are adjusted to be almost the same, and such an adjustment is made on magnifications and/or positions of the first lens G1 and the second lens G2.

Accurate distortion correction based on the first lens G1 and the second lens G2 is affected by all optical factors such as focal distances, curvatures, diameters, the positions of the Z-axis and of the optical axis of the light emitted from the light refractor 10, etc. of the first lens G1 and the second lens G2. When these optical factors are taken into consideration, it is possible to more effectively position the first lens G1 and the second lens G2 and perform distortion correction based on shape characteristics of the first lens G1 and the second lens G2.

Thus far, the example of FIG. 2 in which the first lens G1 and the second lens G2 are disposed on the Z-axis has been described, but the first lens G1 and the second lens G2 do not have to be disposed on one Z-axis as long as the first lens G1 and the second lens G2 are appreciated to have optically the same functions or dispositions. For example, when another optical device is disposed between the first lens G1 and the second lens G2, the first lens G1 and the second lens G2 may be disposed in different directions or on different axes.

The optical lens unit 210 according to an exemplary embodiment of the present invention may include an aperture stop F for blocking incidence of unnecessary external light except light incident through the light refractor 10. In FIG. 2, the aperture stop F is provided behind the second lens G2 and blocks incidence of external light except light emitted from the second lens G2. In addition to the function of blocking external light, the aperture stop F may perform a function of adjusting the amount of light emitted from the second lens G2 and incident on a third lens G3.

Figure 5:
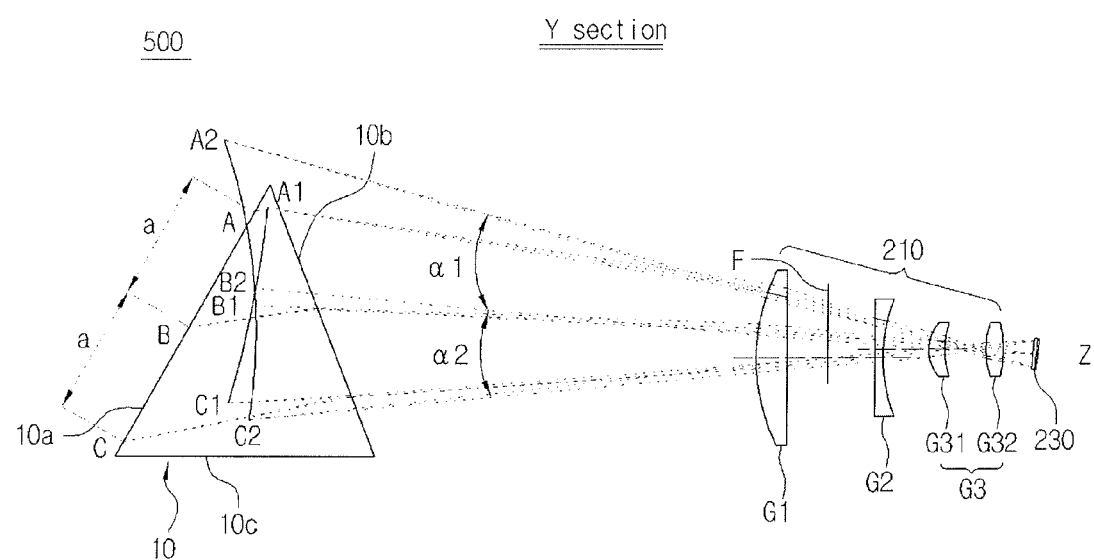
FIG. 5 illustrates a fingerprint acquisition apparatus (Y-section optical system) according to another exemplary embodiment of the present invention.

In another exemplary embodiment shown in FIG. 5, an aperture stop F may be provided between a first lens G1 and a second lens G2 and prevent external light except light emitted from the first lens G1 from being incident on the second lens G2.

The optical lens unit 210 may further include the third lens (or a lens group) G3 for projecting an image of which distortion has been corrected by the first lens G1 and the second lens G2 onto the image sensor 230.

For example, as shown in FIG. 2 and FIG. 3, the optical lens unit 210 includes, as the third lens G3, a third-first lens G31 and a third-second lens G32 that are provided between the second lens G2 and the image sensor 230, reduce an image of which distortion has been corrected, and project the reduced image onto the image sensor 230.

The third-first lens G31 is a convex-concave lens of which a surface of incidence is a convex lens and of which a surface of emission is a concave lens. The third-second lens G32 is a general convex lens.

The centers of the third-first lens G31 and the third-second lens G32 are also oblique to the optical axis of the light emitted from the light refractor 10, and may also be unaligned with the Z-axis. In terms of light or an image, the third-first lens G31 and the third-second lens G32 are also biased to one side.

The image sensor 230 is also installed to be slightly tilted according to the optical axis. Accordingly, the Y-section optical system of FIG. 2 solves a problem that an image is out of focus due to the slope of an A2-B2-C2 plane.

<Exemplary Embodiments>

In the fingerprint acquisition apparatus 200 of FIG. 2, the first lens G1 and the second lens G2 are disposed so that light emitted from the light refractor 10 is incident through upper portions of the first lens G1 and the second lens G2. Specifically, a light ray at the object point A (or a light ray at the corresponding virtual object point) is incident on an upper edge of the first lens G1, and a light ray at the object point C (or a light ray at the corresponding virtual object point) is incident on the approximate center of the first lens G1. However, as mentioned above, it is possible to design a fingerprint acquisition apparatus so that light is incident not on the upper portions of the first lens G1 and the second lens G2, but, instead, is incident on the lower portions.

Figure 6:
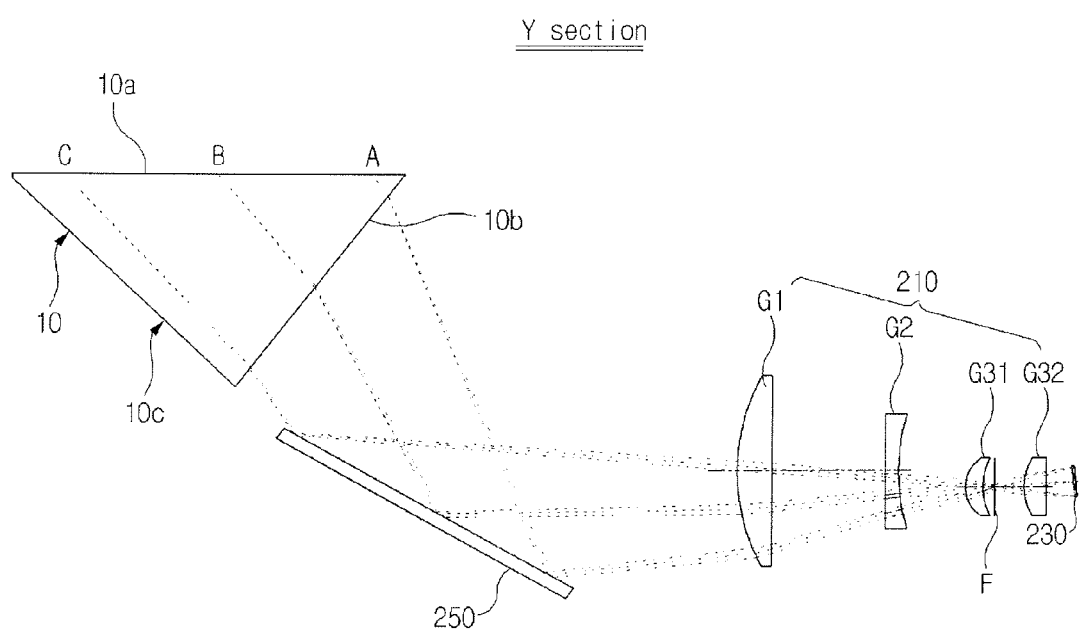
FIG. 6 illustrates a fingerprint acquisition apparatus (Y-section optical system) according to still another exemplary embodiment of the present invention.

For example, a fingerprint acquisition apparatus 600 of FIG. 6 further includes a mirror 250 disposed between a light refractor 10 and a first lens G1. The mirror 250 turns light emitted from the light refractor 10 upside down as an inverted image and also rotates the path of the light by a predetermined angle.

The light emitted from the light refractor 10 is reflected by the mirror 250 and turned upside down as an inverted image. The positions of light rays at the object points A, B, and C (or light rays at the corresponding virtual object points) become inverse with respect to the positions of the light rays in FIG. 2. In order for the fingerprint acquisition apparatus 600 of FIG. 6 to obtain the same effect as the apparatus 200 of FIG. 2, a light ray at the object point C (or a light ray at the corresponding virtual object point) needs to be incident on the approximate center of the first lens G1, and a light ray at the object point A (or a light ray at the corresponding virtual object point) needs to be incident on a lower edge of the first lens G1.

In other words, the light emitted from the light refractor 10 is incident on lower portions of the first lens G1 and the second lens G2. Also, an image sensor 230 is tilted according to an emission angle of the light.

In particular, such a structure of the acquisition apparatus 600 of FIG. 6 is used to reduce the size of the entire module and manufacture the entire apparatus in a specific shape.

The light refractor 10 of FIG. 6 is disposed so that a fingerprint contact surface 10a becomes horizontal. The mirror 250 is disposed at a position for totally reflecting the light emitted from a surface of emission 10b of the light refractor 10 so that an optical axis of the light is in a horizontal direction parallel to the fingerprint contact surface 10a. Thus, a path of the light emitted from the light refractor 10 does not extend in a direction perpendicular to the fingerprint contact surface 10a but extends in the horizontal direction parallel to the fingerprint contact surface 10a. Accordingly, the fingerprint acquisition apparatus 600 of FIG. 6 can be designed in a flat shape by reducing a length in a direction perpendicular to the fingerprint contact surface 10a.

A fingerprint acquisition apparatus according to exemplary embodiments of the present invention can acquire a square fingerprint image by correcting an image that has been distorted through a light refractor.

In particular, the fingerprint acquisition apparatus according to exemplary embodiments of the present invention solves a problem that, in a process of simultaneously acquiring fingerprints of a plurality of fingers, some fingerprints are not acquired because fingerprint images are distorted to trapezoids.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

What is claimed is:

1. An optical fingerprint acquisition apparatus comprising:
a light refractor having a light incidence surface upon which light from a light source is incident on the light refractor, a fingerprint contact surface including an image area upon which a finger may be placed, and a light emission surface from which light entering the light incidence surface and interacting with a fingerprint of a finger placed on the image area of the fingerprint contact surface is emitted from the light refractor;
a plurality of lenses serially arranged along a Z-axis and receiving light emitted from the light emission surface of the light refractor: and
an image sensor acquiring from the plurality of lenses an image of a fingerprint of a finger contacting the image area of the fingerprint contact surface of the light refractor, emitted from the light refractor and incident on the plurality of lenses, wherein
the plurality of lenses includes
a first plano-cylindrical lens having a center and, in cross-section, a cylindrical surface, and a planar surface, wherein light from the light refractor is incident on a light incident surface of the first plano-cylindrical lens,
a second plano-cylindrical lens, forming, with the first plano-cylindrical lens, an anamorphic lens system, and having a center and, in cross-section, a cylindrical surface and a planar surface, wherein light from a light emitting surface of the first plano-cylindrical lens is incident on a light incident surface of the second plano-cylindrical lens, and the centers of the first and second plano-cylindrical lenses lie on the Z-axis, and
a third lens having an optical axis and projecting light emitted from a light emitting surface of the second plano-cylindrical lens onto the image sensor,
a Y-section of the optical fingerprint acquisition apparatus, orthogonal to axes of the cylindrical surfaces of the first and second plano-cylindrical lenses, is orthogonal to an X-section of the optical fingerprint acquisition apparatus, and the Z-axis is orthogonal to the Y-section and the X-section,
the image area has a top side and a bottom side in the Y-section and a left side and a right side in the X-section,
the light refractor introduces optical distortion into the image of a fingerprint of a finger contacting the image area of the fingerprint contact surface of the light refractor and that is emitted from the light refractor, and
the first plano-cylindrical lens and the Z-axis are located relative to the light refractor so that first and second light rays emitted from the light emission surface of the light refractor from the top side and the bottom side of the image area, in the Y-section, are oblique to and asymmetrical with respect to the Z-axis, and one of the first and second light rays is incident proximate the center of the first plano-cylindrical lens in the Y-section, and the other of the first and second light rays is incident on an outer edge of the first plano-cylindrical lens, in the Y-section, whereby the first and second plano-cylindrical lenses correct the optical distortion of the image before the image is incident on the image sensor.

2. The apparatus of claim 1, wherein light rays emitted from the light emission surface of the light refractor from the left side and the right side of the image area, in the X-section, are oblique to and substantially symmetrical with respect to the Z-axis, and are incident on the first plano-cylindrical lens proximate respective outer edges of the first plano-cylindrical lens, in the X-section.

3. The apparatus of claim 1 further comprising an aperture stop located between the first and second plano-cylindrical lenses.

4. The apparatus of claim 1 further comprising an aperture stop located behind the second plano-cylindrical lens.

5. The apparatus of claim 1, wherein the light from the light refractor is incident only on an upper portion or only on a lower portion of the first plano-cylindrical lens, relative to the Z-axis, in the Y-section.

6. The apparatus of claim 1 further comprising a mirror altering path of the light from the light refractor and incident on the first plano-cylindrical lens, and inverting the image of a fingerprint of a finger contacting the image area of the fingerprint contact surface of the light refractor.

7. The apparatus of claim 1, wherein the image sensor is tilted with respect to the Z-axis, in the Y-section.

8. The apparatus of claim 1, wherein
the light incident surface of the first plano-cylindrical lens is cylindrical in cross-section, and the light emission surface of the first plano-cylindrical lens is planar, in the Y-section, and
the light incident surface of the second plano-cylindrical lens is planar, and the light emission surface of the second plano-cylindrical lens is cylindrical in cross-section, in the Y-section.

9. The apparatus of claim 1, wherein the first and second plano-cylindrical lenses have respective magnifying powers so that emission angles of the first and second plano-cylindrical lenses are substantially the same in the Y-section and in the X-section.

10. The apparatus of claim 1, wherein
the third lens includes a fourth lens and a fifth lens serially arranged with respect to light emitted from the second plano-cylindrical lens, between the second plano-cylindrical lens and the image sensor, and projecting the light emitted from the second plano-cylindrical lens onto the image sensor,
the fourth lens has a convex light incident surface on which light emitted from the second plano-cylindrical lens is incident, and a concave light emission surface, and
the fifth lens has a convex light incident surface on which light emitted from the fourth lens is incident, and a convex light emission surface facing the image sensor.

11. The apparatus of claim 10, wherein the fourth and fifth lenses have respective centers, the centers of the fourth and fifth lenses lie on the optical axis of the third lens, and the optical axis of the third lens is offset from the Z-axis.

12. The apparatus of claim 1, wherein the light refractor is a prism.

13. The apparatus of claim 12, wherein the prism has a triangular cross-section in the Y-section.

* * * * *